Dec. 5, 1961  E. KOZAK  3,011,749
COUPLING DEVICE
Filed Dec. 28, 1959

INVENTOR.
BY Edward Kozak
Henry Kozak
ATTORNEY

3,011,749
Patented Dec. 5, 1961

3,011,749
COUPLING DEVICE
Edward Kozak, Cleveland, Ohio, assignor to National
Castings Company, a corporation of Ohio
Filed Dec. 28, 1959, Ser. No. 862,332
7 Claims. (Cl. 248—361)

The present invention relates to a device for connecting together two articles of which each has a recess that may be aligned with the recess of the other article to receive opposite end portions of the device. The invention is particularly useful for fastening a freight container or other article to an undersupport, such as a vehicle flat-bed or the top of another container.

Much effort is currently being made in the transportation industries to develop a universal container transporting system entailing: (1) the use of containers of standard construction, (2) the adoption of all types of heavy carriers for transporting such containers, and (3) the development of equipment for handling and securing such containers relative to carrier or other supporting facilities.

On the highway and the railway, flat-bed type vehicles are regarded as most suitable for transporting the containers. In adapting a carrier, such as a flat-bed vehicle or a hatch-cover of a marine vessel, for receiving the containers it is desirable under some circumstances to avoid projections extending above the plane of the carrying surface in order that the carrier may remain useful for carrying other types of loads.

For this purpose, a system for anchoring or fastening-down containers to a carrier therefor has been devised wherein: the container has at least one recess, generally a plurality thereof, extending upwardly from an undersurface thereof. A carrier therefor has a like number of recesses disposed in its container-receiving surface in mating registry with the container recesses; and a coupling device which may be contained in each pair of mating recesses associated with means to lock the device in both recesses. In this manner, the container is locked to the carrier to prevent tipping or sliding of the container relative to the support.

According to one arrangement, the body of the coupling device projects in one direction as an L-shaped portion having a slidable lock along one side thereof. The L portion and the lock cooperate with one another when disposed within a generally complementary L-shaped recess of a container or carrier, to interlock the device with such a container or carrier. The device also projects opposite to the above-named direction in its lengthwise direction to define an apertured portion having a hole extending therethrough in a direction transverse to the length of the device. The apertured portion, when the device is in use, projects into a generally complementary recess of, e.g., a container, and its passageway cooperates with opening of the container in axial registry therewith to provide a longer passageway for receiving a key.

The present invention is concerned with a particular construction of the lock and the various body portions of the coupling device which assure that a lock will remain in locking position during use and allow facile manual movement of the lock between locking and unlocking positions.

In brief, the invention resides in a coupling device for connecting two articles, such as a freight container and an undersupport therefor, each article having a recess alignable with the recess of the other to receive opposite end-portions of the device. The device comprises an apertured portion and an L portion projecting in opposite directions along a longitudinal axis thereof, and has a slot extending along one side thereof, lengthwise of its axis and both of the portions. The apertured portion has a passageway extending transversely relative to the axis of the device from the slot to the side of the device opposite that in which the slot is defined. The L portion defines a tongue protruding from the side of the device opposite to that in which the slot is disposed. The device further has a lock supported in the slot for movement lengthwise thereof between a locking position and an unlocking position. The lock, in its locking position, comprises a chock section occupying substantially the entire length of that portion of the slot defined by the L portion, and a handle section positioned in that portion of the slot defined by the apertured portion. The handle section has an opening in generally axial relation with the passageway of the apertured portion of the device. The chock section, in order to lock the device in an L-shaped recess generally complementary to the L portion and the chock section is locking position and yet enable the device to be withdrawn from the recess when the lock is retracted to unlocking position, is thicker than the depth of the slot along the L-portion in a direction generally normal to the above-named opposite sides of the device.

In the drawing with respect to which the invention has been described below in detail:

Figure 1:
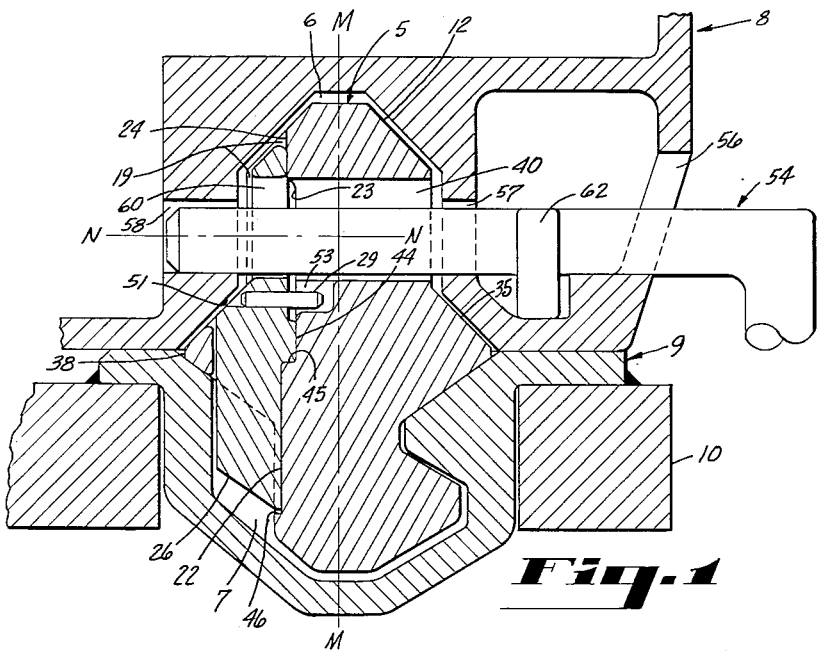
FIG. 1 is a fragmentary elevation in section illustrating recessed portions of a container and a flat-bed vehicle with the device of this invention in place for coupling the container and the vehicle together.

Describing the invention now in detail, FIG. 1 illustrates the coupling device 5 of this invention in position within cooperating recesses 6 and 7 of a freight container 8 and a receptacle 9 mounted in a supporting floor 10 of, e.g., a vehicle flat-bed.

Figures 2, 3, 4:
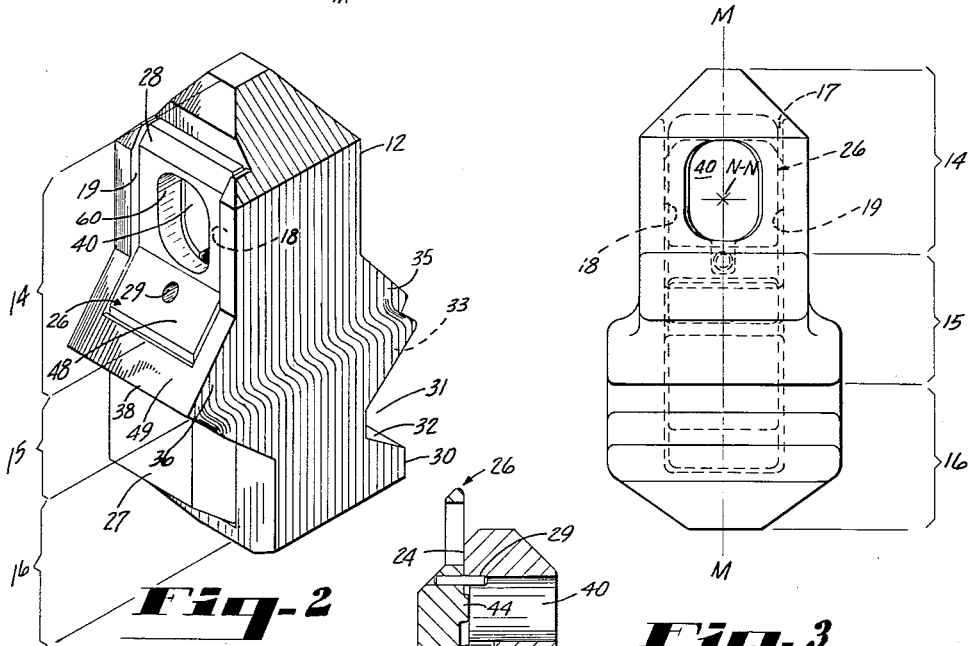
FIG. 2 is a perspective view of the device shown in the other figures.
FIG. 3 is an elevation of the device taken from the side opposite that along which the lock is supported.
FIG. 4 is a fragmentary elevation in section illustrating a recessed portion of a flat-bed with the coupling device of the previous figures positioned therein with its lock retracted to an unlocking position.

As indicated in FIGS. 2 and 3, the device 5 comprises a body 12 having three portions arranged in series relation with respect to a longitudinal axis M—M, namely: an apertured portion 14, an intermediate belt portion 15, and an L-portion 16. The body 12 has a slot 17 extending lengthwise of the body through the three portions 14, 15, 16 thereof. The slot is defined generally by side surfaces 18 and 19 and bottom surfaces 22, 23, and 24 defined by parallel planes at different depths inwardly from the lateral surfaces of the body forming the slotted side of the body.

The L-portion 16 of the body 12 has a tongue 30 extending laterally outwardly from the side of the body opposite the side defining the slot 17. The tongue 30 protrudes in a generally normal direction away from the axis M—M. Its length extends widthwise of the side of the body from which it projects. The tongue is further defined by a notch 31 of which its length is parallel to that of the tongue and is formed by side 32 of the tongue and side 33 of a projection 35 of the belt portion 15.

The projection 35 and another projection 36 which together characterize the belt portion, occur on opposite sides of the body 12 and project laterally therefrom in an approximately symmetrical wedge shaped pattern as to size and shape. These projections produce the laterally outward flare of the body in opposite longitudinal directions at the belt portion. The projection 36 has a portion 38 running widthwise of the slotted side of the body 12 which bridges the slot 17.

The apertured portion 14 of the body 12 has a passageway 40 of which its longitudinal axis N—N extends approximately perpendicularly to the longitudinal axis M—M of the body. One end of the passageway 40 opens in the bottom surface 23 of the slot 17; the other end in the side of the body 12 defining the projection 35, the notch 31 and the tongue 30.

The device 5 further comprises a lock 26 supported in the slot 17 in guide relation with the surfaces defining the slot for movement lengthwise of the body. The lock 26 comprises a chock section 27, an apertured handle section 28, and a pin 29 anchored in the lock at approximately the junction of sections 27 and 28 to protrude laterally inwardly from the inward side of the lock. At this position, the handle portion 28 is disposed completely within that portion of the slot 17 formed by the apertured portion 14 of the body 12 as shown in FIGS. 1 and 2. The handle does not extend laterally beyond the slot as its thickness is no greater than the depth of the slot along the apertured portion 14. FIGS. 1, 2, and 3 illustrate the lock 26 at its locking position relative to the body 12. The lock is movable out of this position to its unlocking position illustrated in FIG. 4, wherein the portion of the pin 29 protruding inwardly from the lock engages the side of the passageway 40 furthest from the portion 11 of the body. Such engagement defines one end of the range of movement of the lock, i.e., the unlocking position. At the other end of such range, the lock is in its locking position as determined by the engagement of a lug 44 of the lock with a shoulder surface 45 facing longitudinally of the body 12 toward its apertured portion and connecting bottom surfaces 22 and 23 of the recess. The lug 44 protrudes from the rearward side of the chock section 27 of the lock, its length extends the entire width of the lock transversely of the length of the body. In the embodiment illustrated, the lock seats at locking position on the surface 45 rather than on an end surface 46 of the slot 17. If desired, the surface 46 may be utilized as a seating surface.

The projection 36 of the body 12, in bridging the slot 17, forms a tunnel portion of the slot. The chock section 27, at locking position of the lock, substantially fills the tunnel portion of the slot in three dimensions, with an oblique surface 48 of the lock in flush, substantially coplanar relation with an inclined surface 49 of the belt portion of the body. As illustrated in FIG. 1, a tapered surface 51 in the recess 6 of the container 8 overlies both surfaces 48 and 49 when the device is in use and effectively traps the lock 26 in its locking position. The pin 29 is also trapped in a similar manner as to preclude loss thereof. At this position, the pin 29 occupies a recess 53 provided in the body 12 inwardly from the surface 23 and the side of the passageway 40 nearest the L-portion 16 of the body. This arrangement disposes that portion of the pin protruding from the lock out of possible interference with a key 54 adapted for insertion through openings 56, 57 and 58 of the container 8, and when the device 5 is in use, through the passageway 40 and an opening 60 in the handle section of the lock in approximately coaxial relation with the passageway 40. The key 54 comprises a generally circular element 62 in eccentric relation with the key shaft which is traversable through the opening 57 in the axial direction of the shaft portion of the key when turned 180 degrees from the position shown and moved axially. This enables withdrawal of the key from the assembly shown in FIG. 1.

In the use of the device 5, removal from or application to the recessed fitting 9 of the support 10 can only be effected when the container 8 and the key 54 are detached from the device 5. This is necessary in order to permit movement of the lock between its locking and unlocking positions necessary for insertion or withdrawal of the L-portion 16 relative to the recess 7. For example, as shown in FIG. 4, retraction of the lock to its unlocking position permits sufficient lateral displacement of the L-portion to facilitate movement thereof into and out of the recess 7. With the device 5 in place, as shown in FIG. 4, and the lock subsequently dropped to its locking position, the device is in a condition to receive the container 8. The container may thereupon be positioned over the device, as shown in FIG. 1, and the key 34 inserted through the openings 56, 57, 58, 60 and the passageway 40 in an axial posture 180 degrees from that shown. Thereafter, the key is turned 180 degrees to secure it against unintentional removal.

In separating the assembly of FIG. 1, the reverse procedure is followed. First, the key is removed, then the container 8 is lifted free of the support 9 and the device 5. Thereupon, the device may be manually separated from the fixture 9 by inserting a finger into the opening 60 into the lock and lifting the lock relative to the body 12 to the position shown in FIG. 4. The device may then be manually and easily lifted free of the fixture 8.

So far as is known, the above description discloses improvements, particularly in the structure of the lock 26, which render the device 5 easier to assemble and especially to use, and of more dependable construction than any device of similar general construction heretofore known.

The terms and expressions which have been employed are used as terms of description and not of limitation, and there is no intention of excluding such equivalents of the invention described or of the portions thereof as fall within the purview of the claims.

What is claimed is:

1. A device for connecting two articles whereof each has a recess alignable with the recess of the other to receive opposite end portions of the device; the device comprising: a body having an apertured portion and an L-portion projecting in opposite directions along a longitudinal axis of the body; the body having a slot extending along one side thereof lengthwise of said axis and both of said portions; the apertured portion having a passageway extending transversely relative to said axis from said slot to the side of the body opposite said one side; said L-portion defining a tongue protruding from said opposite side away from said axis; a lock supported in said slot for movement lengthwise thereof; said lock, in its locking position, comprising a chock section positioned in that portion of the slot defined by the L-portion and a handle section positioned in that portion of the slot defined by the apertured portion; said handle section having an opening in generally axial registry with said passageway adapting the device for extension of a pin through the passageway and the opening; said chock section being thicker than the depth of the slot in a direction generally normal to said sides; said lock being movable along said slot from said locking position to an unlocking position disposing said chock section closer to said apertured body portion; said handle, at said locking position, having a thickness no greater than the depth of, and being completely disposed within, that portion of the slot along said apertured portion.

2. The device of claim 1 comprising: cooperating abutment means on the lock and the body limiting longitudinal movement of the lock to a range between said locking position and an unlocking position placing said chock section out of projecting relation with the outer contour of said L-portion.

3. The device of claim 2 wherein: the portion of said abutment means defining the unlocking position is a removable pin anchored in said lock and extending transversely relatively to length of said body in partly overlapping relation with the length of said passageway; said pin being positioned lengthwise of the lock to engage the side of the passageway furthest from the L-portion at the unlocking position.

4. A device for connecting two articles in surface-to-surface engagement, each article having a recess alignable with the recess of the other to receive a portion of the device; the device comprising a body having an apertured portion, a belt portion, and an L-portion arranged in the order named along a longitudinal axis of the body; said body having a slot extending in its longitudinal direction along one side thereof substantially lengthwise of said three portions; said apertured portion having a passageway extending transversely from said slot to the side of the body opposite said one side; said L-portion having a tongue protruding laterally from the said opposite side away from said axis; a lock supported in said slot for reciprocation lengthwise therein; said lock, in its locking position, having a chock section positioned in that portion of the slot defined by the L-portion, and a handle section in that portion of the slot defined by the apertured portion; said handle section having an aperture in generally axial registry with said passageway; said chock section having a greater thickness than the depth of said slot along said L-portion in a direction normal to said opposite sides; said belt portion flaring laterally outwardly with respect to said other body portions along said opposite sides; said handle, at said locking position, having a thickness no greater than the depth of, and being completely disposed within, that portion of the slot along said apertured portion.

5. The device of claim 4 wherein: said belt portion bridges the slot to define a tunnel portion of the slot permitting passage thereinto of said chock section; said chock section, at locking position, terminating at the tunnel portion of the slot.

6. The device of claim 4 wherein: the belt portion flares outwardly in opposite longitudinal directions to form laterally-pointing wedge-shaped projections along both of said opposite sides of the body, and one of the projections bridges the slot to define a tunnel portion thereof permitting passage therethrough of said chock section; the chock section being of a length and thickness as to substantially occupy the tunnel portion at locking position in three dimensions.

7. The device of claim 4 wherein: the belt portion comprises laterally-pointing wedge-shaped projections along both of said opposite sides of the body, and one of the projections bridges the slot to form a tunnel portion thereof; said lock, at locking position, substantially occupying the tunnel portion in respect to three dimensions and having a lug along its inner side in approximate transverse alignment with the projections and in cooperating abutting relation with a longitudinally-facing shoulder of the body in said slot for stopping movement of the lock toward said L-portion at locking position; said slot being recessed along said apertured body portion for accommodating said lug in movement of the lock to an unlocking position; said lock having a removable pin extending transversely inwardly therefrom to partly overlap the length of said passageway; said pin being positioned lengthwise of the lock to engage the side of the passageway furthest from the body L-portion at unlocking position of the lock; said body having a recess in the side of the passageway nearest the said L-portion to receive the pin at locking position of the lock.

References Cited in the file of this patent
UNITED STATES PATENTS

| | | |
|---|---|---|
| 2,408,547 | Bertschinger | Oct. 1, 1946 |
| 2,489,864 | Cravener | Nov. 29, 1949 |
| 2,730,687 | Modrey | Jan. 10, 1956 |
| 2,836,444 | Arnold | May 27, 1958 |